(12) United States Patent
Antia et al.

(10) Patent No.: US 9,941,952 B2
(45) Date of Patent: *Apr. 10, 2018

(54) INROUTE BURST HEADER IN A VSAT SYSTEM

(71) Applicant: Hughes Network Systems, LLC, Germantown, MD (US)

(72) Inventors: Yezdi Antia, North Potomac, MD (US); Mustafa Eroz, Germantown, MD (US); John Alfred Schmid, Darnestown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/438,178

(22) Filed: Feb. 21, 2017

(65) Prior Publication Data
US 2017/0170891 A1    Jun. 15, 2017

Related U.S. Application Data

(63) Continuation of application No. 14/483,744, filed on Sep. 11, 2014, now Pat. No. 9,680,562.

(51) Int. Cl.
H04B 7/185    (2006.01)

(52) U.S. Cl.
CPC ..... *H04B 7/18528* (2013.01); *H04B 7/18513* (2013.01)

(58) Field of Classification Search
CPC .............................. H04L 27/20; H04B 7/18528
See application file for complete search history.

(56) References Cited

U.S. PATENT DOCUMENTS

| 4,468,770 A * | 8/1984 | Metcalf .................. H04L 1/005 375/362 |
| 6,405,039 B1 * | 6/2002 | Koorapaty ............ H04L 1/0059 370/207 |

(Continued)

OTHER PUBLICATIONS

ETSI EN 302 307 v1.2.1; "Digital Video Broadcasting (DVB); Second generation framing structure, channel coding and modulation systems for Broadcasting, Interactive Services, News Gathering and other broadband satellite applications (DVB-S2)", European Telecommunications Standards Institute, Aug. 2009.

*Primary Examiner* — Redentor Pasia
(74) *Attorney, Agent, or Firm* — Edell, Shapiro & Finnan, LLC; Richard C. Irving (57) ABSTRACT

A satellite terminal and a machine-implemented method are provided for encoding a burst header of a burst for transmission on an inroute. One component of a group of satellite terminal components consisting of an ASIC, a FPGA, and a DSP, generates a burst header having five information bits encoded therein. The five information bits may be encoded using a Reed-Muller code, a (32, 5) block code or a convolutional code having a code rate of either 1/5 or 1/10. The five information bits may represent one or more of a modulation type for a payload of the burst, a code rate for encoding the payload, a code type, and a spreading factor for spreading the payload during transmission. A satellite gateway and a machine-implemented method are also provided for decoding a burst header of a burst received on an inroute as described above.

20 Claims, 7 Drawing Sheets

(56) References Cited

U.S. PATENT DOCUMENTS

| | | |
|---|---|---|
| 6,516,443 B1 | 2/2003 | Zook |
| 8,595,590 B1 | 11/2013 | Vojcic et al. |
| 2004/0057401 A1* | 3/2004 | Dick .................. H04L 1/0041 |
| | | 370/329 |
| 2005/0053163 A1 | 3/2005 | Yoon et al. |
| 2009/0144604 A1 | 6/2009 | Mansour |
| 2011/0043391 A1 | 2/2011 | Lee et al. |
| 2013/0028175 A1 | 1/2013 | Jong et al. |
| 2014/0056255 A1* | 2/2014 | Aghili ................. H04L 5/0053 |
| | | 370/329 |
| 2014/0115429 A1 | 4/2014 | Eroz et al. |
| 2015/0207650 A1* | 7/2015 | Spyropoulos ............ H04B 1/16 |
| | | 375/340 |
| 2015/0295695 A1* | 10/2015 | Davydov .............. H04W 72/12 |
| | | 370/329 |
| 2016/0182189 A1* | 6/2016 | Stadali ................. H04L 1/0003 |
| | | 370/474 |

\* cited by examiner

FIG. 1

| RADIO TURN ON 202 | UW 204 | BURST HEADER 206 | PAYLOAD (N SYMBOLS) 208 | RADIO TURN OFF 210 |

| Burst Header | Modulation | Code Rate | Spreading Factor |
|---|---|---|---|
| 0 | OQPSK | 1/3 | 0 |
| 1 | OQPSK | 1/2 | 0 |
| 2 | OQPSK | 2/3 | 0 |
| 3 | OQPSK | 4/5 | 0 |
| 4 | OQPSK | 9/10 | 0 |
| 5 | 8PSK | 1/2 | 0 |
| 6 | 8PSK | 2/3 | 0 |
| 7 | 8PSK | 4/5 | 0 |
| 8 | 8PSK | 8/9 | 0 |
| 9 | 16APSK | 1/2 | 0 |
| 10 | 16APSK | 2/3 | 0 |
| 11 | 16APSK | 4/5 | 0 |
| 12 | 16APSK | 8/9 | 0 |
| 13 | OQPSK | 1/3 | 8 |
| 14 | OQPSK | 1/2 | 8 |
| 15 | OQPSK | 2/3 | 8 |
| 16 | OQPSK | 4/5 | 8 |
| 17 | OQPSK | 9/10 | 8 |
| 18 | 8PSK | 1/2 | 8 |
| 19 | 8PSK | 2/3 | 8 |
| 20 | 8PSK | 4/5 | 8 |
| 21 | 8PSK | 8/9 | 8 |
| 22 | 16APSK | 1/2 | 8 |
| 23 | 16APSK | 2/3 | 8 |
| 24 | 16APSK | 4/5 | 8 |
| 25 | 16APSK | 8/9 | 8 |
| 26 | OQPSK | 1/2 | 16 |
| 27 | OQPSK | 2/3 | 16 |
| 28 | OQPSK | 4/5 | 16 |
| 29 | OQPSK | 9/10 | 16 |
| 30-31 | Reserved | | |

FIG. 4

| Burst Modulation Type | Burst Header | | |
|---|---|---|---|
| | Coded bit | Even Bit to Symbol Mapping | Odd Bit to Symbol Mapping |
| OQPSK | 0 | 00 | 10 |
| | 1 | 11 | 01 |
| 8PSK | 0 | 000 | 110 |
| | 1 | 011 | 101 |
| 16APSK | 0 | 1100 | 1110 |
| | 1 | 1111 | 1101 |

FIG. 6

OQPSK BIT TO SYMBOL MAPPING

| Symbol | Bit Pair | Modulated Symbol ($I(k) + j Q(k)$) |
|---|---|---|
| 0 | (1, 1) | $(1+j)/\sqrt{2}$ |
| 1 | (0, 1) | $(-1+j)/\sqrt{2}$ |
| 2 | (1, 0) | $(1-j)/\sqrt{2}$ |
| 3 | (0, 0) | $(-1-j)/\sqrt{2}$ |

FIG. 7

8PSK BIT TO SYMBOL MAPPING

| Symbol | Bit Pair | Modulated Symbol (I(k) + j Q(k)) |
|---|---|---|
| 0 | 000 | $(1+j)/\sqrt{2}$ |
| 1 | 001 | $(1+j0)$ |
| 2 | 010 | $(-1+j0)$ |
| 3 | 011 | $(-1-j)/\sqrt{2}$ |
| 4 | 100 | $(0+j)$ |
| 5 | 101 | $(1-j)/\sqrt{2}$ |
| 6 | 110 | $(-1+j)/\sqrt{2}$ |
| 7 | 111 | $(0-j)$ |

FIG. 8

16APSK BIT TO SYMBOL MAPPING

| Symbol | Bit Pair | Modulated Symbol |
|---|---|---|
| 0 | 0000 | $r_2 e^{j(\frac{\pi}{6}+\theta_2)}$ |
| 1 | 0001 | $r_2 e^{j(\frac{10\pi}{6}+\theta_2)}$ |
| 2 | 0010 | $r_2 e^{j(\frac{4\pi}{6}+\theta_2)}$ |
| 3 | 0011 | $r_2 e^{j(\frac{7\pi}{6}+\theta_2)}$ |
| 4 | 0100 | $r_2 e^{j(\theta_2)}$ |
| 5 | 0101 | $r_2 e^{j(\frac{11\pi}{6}+\theta_2)}$ |
| 6 | 0110 | $r_2 e^{j(\frac{5\pi}{6}+\theta_2)}$ |
| 7 | 0111 | $r_2 e^{j(\frac{6\pi}{6}+\theta_2)}$ |
| 8 | 1000 | $r_2 e^{j(\frac{2\pi}{6}+\theta_2)}$ |
| 9 | 1001 | $r_2 e^{j(\frac{9\pi}{6}+\theta_2)}$ |
| 10 | 1010 | $r_2 e^{j(\frac{3\pi}{6}+\theta_2)}$ |
| 11 | 1011 | $r_2 e^{j(\frac{8\pi}{6}+\theta_2)}$ |
| 12 | 1100 | $r_1 e^{j(\theta_1)}$ |
| 13 | 1101 | $r_1 e^{j(\frac{3\pi}{2}+\theta_1)}$ |
| 14 | 1110 | $r_1 e^{j(\frac{\pi}{2}+\theta_1)}$ |
| 15 | 1111 | $r_1 e^{j(\frac{2\pi}{2}+\theta_1)}$ |

INROUTE BURST HEADER IN A VSAT SYSTEM

This application is a continuation application of co-pending U.S. patent application Ser. No. 14/483,744, filed Sep. 11, 2014, which is incorporated by reference herein in its entirety.

FIELD OF THE INVENTION

The invention relates to an inroute burst header in a very small aperture terminal (VSAT) system and more particularly to use of an inroute burst header as an identifier of one or more physical layer characteristics of a remaining portion of a burst (i.e., a payload). The physical layer characteristics that may be identified in the burst header may include one or more of a modulation type, a code rate, a code type, and a spreading factor for transmitting the remaining portion of the burst.

BACKGROUND

In an existing VSAT system, a modulation type and a symbol rate is fixed per inroute frequency and is thus a priori known to a satellite gateway. A respective unique word (UW) within each burst signals a respective code rate for each of the bursts to a satellite gateway demodulator. The UW currently signals one of four different code rates to the satellite gateway. The UW contains 40 symbols. The satellite gateway demodulator may include either four correlators or one fast correlator to perform correlation on the four different UWs. The four correlators or the one fast correlator may be expensive.

If one desires the UW to signal one of two modulation types, each of which has one of four possible code rates, then the UW should be capable of representing eight different combinations. To be able to find eight UWs with good auto and cross correlation properties, and which is just 40 symbol long, would be a difficult task. As a result, a length of the UW would be increased. As an example, the length of the UW may be increased to 64 symbols or another suitable length. Further, each time the length of the UW is expanded to accommodate a larger number of combinations, another good set of UWs must be found and more bandwidth is consumed resulting in a less efficient use of bandwidth.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In an embodiment, a machine-implemented method is provided for encoding a burst header of a burst to be transmitted on an inroute from a satellite terminal. An application specific integrated circuit of a satellite terminal generates a burst header having encoded therein, via a (16, 5) Reed-Muller code, a (32, 5) block code or a convolutional code having a code rate of either 1/5 or 1/10, five information bits representing a modulation type for modulating a payload of the burst and a code rate for the payload. The burst header is provided to a modulator to modulate the burst header via a binary phase shift keying modulation. The payload data is provided to the modulator to modulate the payload data via a modulation matching the modulation type encoded within the burst header. The modulated burst header and the modulated payload data are transmitted. The modulated payload data has a first code rate that matches the code rate encoded within the burst header.

In a second embodiment, a machine-implemented method for decoding a burst header of a burst is provided. A satellite gateway receives the burst header and encoded payload data of the burst and demodulates the burst header based on a predefined phase shift keying modulation which was used to modulate the burst header. The burst header has five information bits encoded therein via a (16, 5) Reed-Muller code, a (32, 5) block code or a convolutional code with a code rate of either 1/5 or 1/10. The five information bits indicate, with respect to the payload data, a modulation type and a first code rate. The payload data, which was encoded at the first code rate, was modulated using the modulation type.

In a third embodiment, a satellite terminal is provided. The satellite terminal includes an application specific integrated circuit, a modulator, and a transmitter. The application specific integrated circuit generates a burst header for a burst. The burst header has encoded therein, via a (16, 5) Reed-Muller code, a (32, 5) block code or a convolutional code having a code rate of either 1/5 or 1/10, five information bits representing a modulation type for a payload of the burst, and a code rate for the payload. The modulator modulates the burst header via a binary phase shift keying modulation and modulates the payload via a modulation matching the modulation type indicated within the encoded burst header. The transmitter transmits the modulated burst header and the modulated payload, wherein the modulated payload is encoded at a first code rate matching the code rate encoded within the burst header. In an alternate embodiment, instead of an application specific integrated circuit, the satellite terminal may include a field programmable gate array (FPGA) or a digital signal processor.

DRAWINGS

In order to describe the manner in which the above-recited and other advantages and features can be obtained, a more particular description is provided below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

A satellite terminal and a machine-implemented method are provided for encoding a burst header of a burst for transmission on an inroute from a satellite terminal to a satellite gateway. In various embodiments, an application specific integrated circuit (ASIC), a field programmable gate array (FPGA), or a digital signal processor (DSP) of a satellite terminal generates a burst header for a burst. Five information bits may be encoded within the burst header using a (16, 5) Reed-Muller code, a (32, 5) block code or a convolutional code having a code rate of either 1/5 or 1/10. The five information bits may represent a modulation type for a payload of the burst and a code rate for encoding the payload. In some embodiments, the five information bits may further represent a spreading factor for spreading the payload during transmission and a code type for encoding the payload. In some embodiments, the burst header may be modulated via a binary phase shift keying modulation.

In various embodiments, when the five information bits are encoded using the (16, 5) Reed-Muller code, the resulting 16 bit codeword may be repeated to produce 32 bits for the burst header. In other embodiments, when the five information bits are encoded using a convolutional code, the code rate may be either 1/5 or 1/10. Thus, when the code rate is 1/10, encoding the five information bits produces a 50 bit codeword for the burst header. When the code rate is 1/5, encoding the five information bits produces a 25 bit codeword, which may be repeated to produce 50 bits for the burst header.

Embodiments may include a satellite gateway and a machine-implemented method for decoding a burst header of a burst to produce five information bits representing a modulation type and a code rate for a payload of the burst. In some embodiments, the five information bits may further represent one or more of a spreading factor for spreading the payload during transmission and a code type used for encoding the payload.

Exemplary Operating Environment

Figure 1:
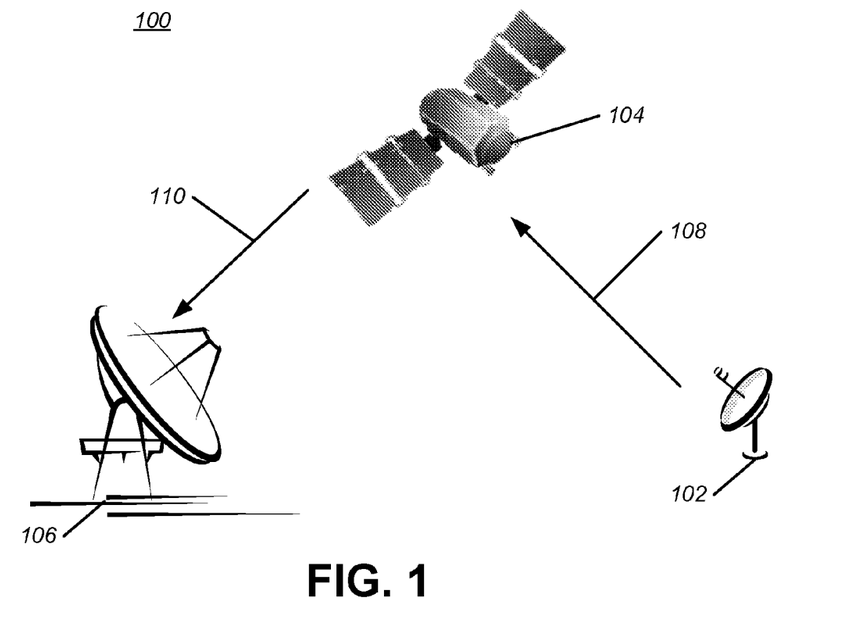
FIG. 1 illustrates an exemplary operating environment for various embodiments.

FIG. 1 illustrates an exemplary operating environment 100, in which various embodiments may operate. Exemplary operating environment 100 may include a satellite 104 in an orbit, a satellite gateway 106, and a satellite terminal 102. Satellite terminal 102 may be a very small aperture terminal (VSAT), which may transmit a burst on an inroute 108, 110 to satellite gateway 106 via satellite 104.

Exemplary Burst

Figure 2:
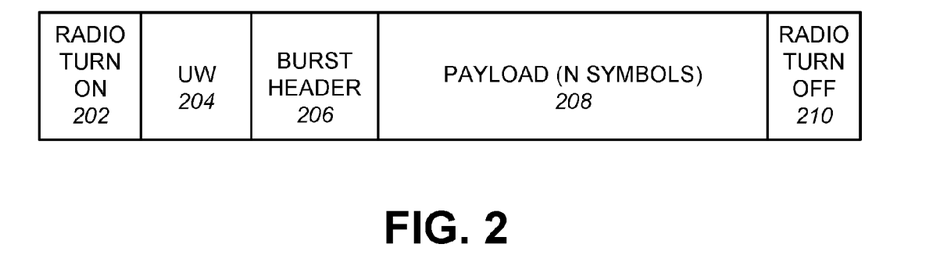
FIG. 2 illustrates a layout of an exemplary burst.

FIG. 2 illustrates an exemplary burst 200 consistent with various embodiments of the invention. Transmission of the burst 200 may begin with a radio portion of a transmitter turning on 202, transmission of a UW 204 for at least synchronization purposes, transmission of a burst header 206 that signals various physical attributes of a payload 208, transmission of payload 208, which includes a number of symbols, and turning off 210 of the radio portion of the transmitter.

Satellite Terminal

Figure 3:
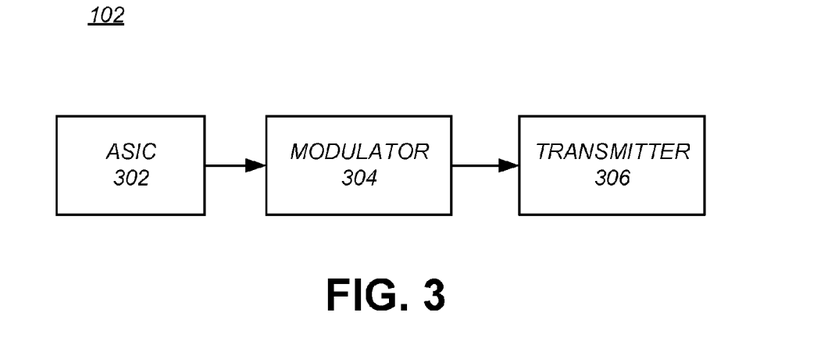
FIG. 3 illustrates functional block diagram of a portion of an exemplary satellite terminal.

FIG. 3 is a functional block diagram illustrating a portion of satellite terminal 102. Satellite terminal 102 may include an application specific integrated circuit (ASIC) 302, a modulator 304 and a transmitter 306. ASIC 302 may encode bits representing information according to a particular encoding scheme, which may include a Reed Muller code, a convolutional code, a (32, 5) block code or another type of encoding scheme. Modulator 304 may receive the encoded bits and may modulate the encoded bits via a type of modulation such as, for example, a binary phase shift keying (BPSK) modulation type, an offset quadrature phase shift keying (OQPSK) modulation type, an 8 phase shift keying (8PSK) modulation type, or a 16 amplitude and phase shift keying (16APSK) modulation type. Transmitter 306 transmits the modulated encoded bits as symbols according to the modulation type. In an alternate embodiment, ASIC 302 may be replaced with a FPGA or a DSP.

Burst Header Encoding

In one embodiment, a (16, 5) Reed-Muller code may be used to encode five information bits $u=[u_4\ u_3\ u_2\ u_1\ u_0]$. The following generator matrix, G, may be used to Reed-Muller encode the five information bits for a burst header.

$$G = \begin{bmatrix} 0 & 1 & 0 & 1 & 0 & 1 & 0 & 1 & 0 & 1 & 0 & 1 & 0 & 1 & 0 & 1 \\ 0 & 0 & 1 & 1 & 0 & 0 & 1 & 1 & 0 & 0 & 1 & 1 & 0 & 0 & 1 & 1 \\ 0 & 0 & 0 & 0 & 1 & 1 & 1 & 1 & 0 & 0 & 0 & 0 & 1 & 1 & 1 & 1 \\ 0 & 0 & 0 & 0 & 0 & 0 & 0 & 0 & 1 & 1 & 1 & 1 & 1 & 1 & 1 & 1 \\ 1 & 1 & 1 & 1 & 1 & 1 & 1 & 1 & 1 & 1 & 1 & 1 & 1 & 1 & 1 & 1 \end{bmatrix}$$

Any 5 bit information vector $u=[u_4\ u_3\ u_2\ u_1\ u_0]$ may be encoded onto a 16 bit codeword, c, using $c=u \cdot G$. The 16 bit codeword may then be repeated once to produce 32 bits for the burst header. The burst header may be transmitted using a BPSK modulation. The BPSK modulation is very robust and works well at a low Es/No, where Es is symbol energy of the signal and No is noise. For example, when Es/No≥−1 db, and a (16, 5) Reed-Muller code is used to encode five information bits onto a 16 bit codeword, which is repeated once and included as 32 bits of the burst header, the BPSK modulation is robust enough to work under these conditions. When only 16 bits of the codeword, with no repetition, is included in the burst header, the BPSK modulation is robust enough to work when Es≥2 db. In some embodiments, the BPSK modulation may be a $$\frac{\pi}{2}$$

shifted BPSK modulation.

In another embodiment a (32, 5) block code may be used to encode the five information bits onto a 32 bit codeword. Any 5 bit information vector $u=[u_4\ u_3\ u_2\ u_1\ u_0]$ may be encoded onto a 32 bit codeword, c, using $c=u \cdot G$, where G is given by the block code generator matrix as $$G = \begin{bmatrix} 0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 & 0 & 1 \\ 0 & 0 & 1 & 1 & 0 & 0 & 1 & 1 & 0 & 0 & 1 & 1 & 0 & 0 & 1 & 1 & 0 & 0 & 1 & 1 & 0 & 0 & 1 & 1 & 0 & 0 & 1 & 1 & 0 & 0 & 1 & 1 \\ 0 & 0 & 0 & 0 & 1 & 1 & 1 & 1 & 0 & 0 & 0 & 0 & 1 & 1 & 1 & 1 & 0 & 0 & 0 & 0 & 1 & 1 & 1 & 1 & 0 & 0 & 0 & 0 & 1 & 1 & 1 & 1 \\ 0 & 0 & 0 & 0 & 0 & 0 & 0 & 0 & 1 & 1 & 1 & 1 & 1 & 1 & 1 & 1 & 0 & 0 & 0 & 0 & 0 & 0 & 0 & 0 & 1 & 1 & 1 & 1 & 1 & 1 & 1 & 1 \\ 0 & 0 & 0 & 0 & 0 & 0 & 0 & 0 & 0 & 0 & 0 & 0 & 0 & 0 & 0 & 0 & 1 & 1 & 1 & 1 & 1 & 1 & 1 & 1 & 1 & 1 & 1 & 1 & 1 & 1 & 1 & 1 \end{bmatrix}$$

In a third embodiment, a convolutional code may be used to encode the five information bits onto a 50 bit codeword. In some implementations, a convolutional encoder may perform tail biting. In other words, tail bits are not transmitted. Alternatively, instead of encoding the five information bits onto a 50 bit codeword, a convolutional code may encode the five information bits onto a 25 bit codeword, which may be repeated and included as 50 bits of the burst header.

Figure 4:
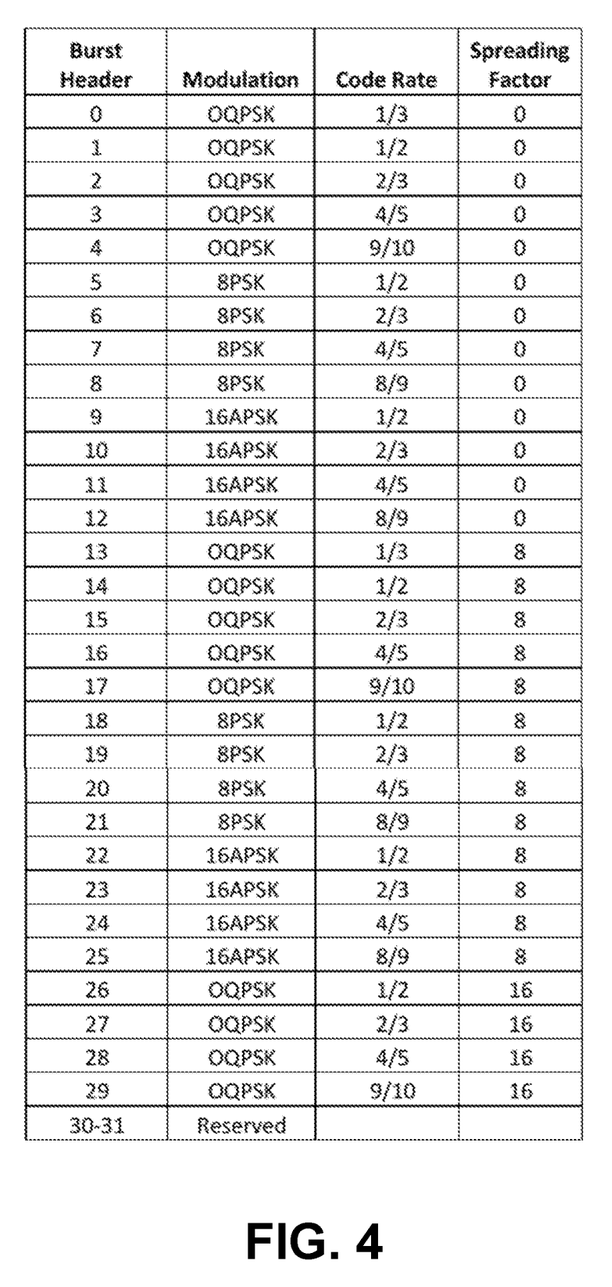
FIG. 4 shows an exemplary table which maps a value of information bits encoded within a burst header to a modulation type, a code rate and a spreading factor.

FIG. 4 illustrates an exemplary table which maps a value of the information bits of a burst header to a modulation type, code rate, and spreading factor for a payload of a burst including the burst header. As shown in the table, the information bits having a value of 0 indicates that the payload is transmitted using OQPSK modulation, a code rate of 1/3, and a spreading factor of 0. The information bits having a value of 1 indicates that the payload is transmitted using the OQPSK modulation, a code rate of 1/2, and a spreading factor of 0. The information bits having a value of 2 indicates that the payload is transmitted using OQPSK modulation, a code rate of 2/3, and a spreading factor of 0. The information bits having a value of 3 indicates that the payload is transmitted using OQPSK modulation, a code rate of 4/5, and a spreading factor of 0. The information bits having a value of 4 indicates that the payload is transmitted using OQPSK modulation, a code rate of 9/10, and a spreading factor of 0. The information bits having a value of 5 indicates that the payload is transmitted using 8PSK modulation, a code rate of 1/2, and a spreading factor of 0. The information bits having a value of 6 indicates that the payload is transmitted using 8PSK modulation, a code rate of 2/3, and a spreading factor of 0. The information bits having a value of 7 indicates that the payload is transmitted using 8PSK modulation, a code rate of 4/5, and a spreading factor of 0. The information bits have a value of 8 indicates that the payload is transmitted using 8PSK modulation, a code rate of 8/9, and a spreading factor of 0. The information bits having a value of 9 indicates that the payload is transmitted using 16APSK modulation, a code rate of 1/2, and a spreading factor of 0. The information bits having a value of 10, the payload is transmitted using 16APSK modulation, a code rate of 2/3, and a spreading factor of 0. The information bits having a value of 11 indicates that the payload is transmitted using 16APSK modulation, a code rate of 4/5, and a spreading factor of 0. The information bits having a value of 12 indicates that the payload is transmitted using 16APSK modulation, a code rate of 8/9, and a spreading factor of 0. The information bits have a value of 13, the payload is transmitted using OQPSK modulation indicates that a code rate of 1/3, and a spreading factor of 8. The information bits having a value of 14 indicates that the payload is transmitted using OQPSK modulation, a code rate of 1/2, and a spreading factor of 8. The information bits having a value of 15 indicates that the payload is transmitted using OQPSK modulation, a code rate of 2/3, and a spreading factor of 8. The information bits having a value of 16 indicates that the payload is transmitted using OQPSK modulation, a code rate of 4/5, and a spreading factor of 8. The information bits having a value of 17 indicates that the payload is transmitted using OQPSK modulation, a code rate of 9/10, and a spreading factor of 8. The information bits having a value of 18 indicates that the payload is transmitted using 8PSK modulation, a code rate of 1/2, and a spreading factor of 8. The information bits having a value of 19 indicates that the payload is transmitted using 8PSK modulation, a code rate of 2/3, and a spreading factor of 8. The information bits having a value of 20 indicates that the payload is transmitted using 8PSK modulation, a code rate of 4/5, and a spreading factor of 8. The information bits having a value of 21 indicates that the payload is transmitted using 8PSK modulation, a code rate of 8/9, and a spreading factor of 8. The information bits have a value of 22 indicates that the payload is transmitted using 16APSK modulation, a code rate of 1/2, and a spreading factor of 8. The information bits having a value of 23 indicates that the payload is transmitted using 16APSK modulation, a code rate of 2/3, and a spreading factor of 8. The information bits have a value of 24 indicates that the payload is transmitted using 16APSK modulation, a code rate of 4/5, and a spreading factor of 8. The information bits having a value of 25 indicates that the payload is transmitted using 16APSK modulation, a code rate of 8/9, and a spreading factor of 8. The information bits have a value of 26 indicates that the payload is transmitted using OQPSK modulation, a code rate of 1/2, and a spreading factor of 16. The information bits having a value of 27 indicates that the payload is transmitted using OQPSK modulation, a code rate of 2/3, and a spreading factor of 16. The information bits having a value of 28 indicates that the payload is transmitted using OQPSK modulation, a code rate of 4/5, and a spreading factor of 16. The information bits having a value of 29 indicates that the payload is transmitted using OQPSK modulation, a code rate of 9/10, and a spreading factor of 16. Values of 30 and 31 for the information bits may be reserved for future use.

Additional information may also be represented by the five information bits. For example, the five information bits may further represent a code type for encoding the payload, including, but not limited to, Turbo Coding and LDPC (low density parity check) coding. For example, with reference to FIG. 4, the information bits having a value of 1 indicates that the payload is transmitted using the OQPSK modulation, a code rate of 1/2, using Turbo Coding and spreading factor of 0. Whereas the information bits having a value of 2 indicates that the payload is transmitted using the OQPSK modulation, a code rate of 2/3, using LDPC coding and spreading factor of 0.

Figure 5:
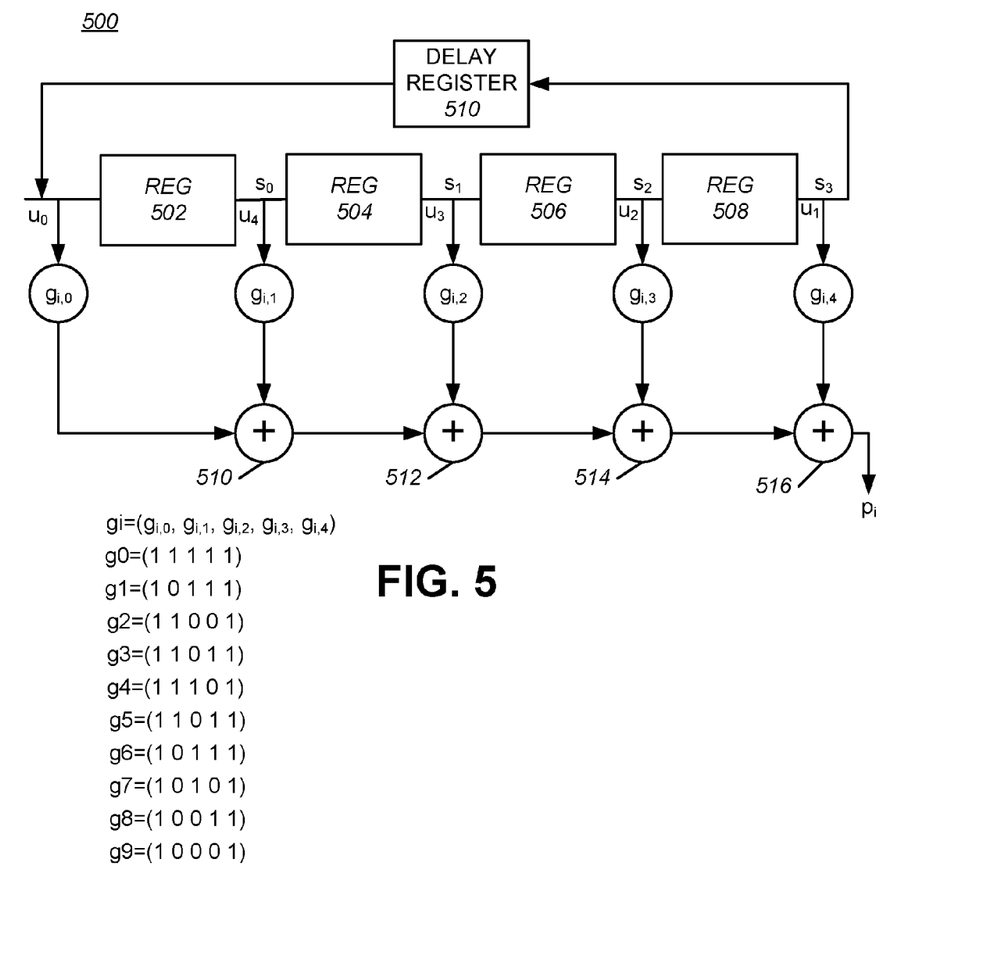
FIG. 5 shows an exemplary structure of an encoder for encoding five information bits according to a (50, 5) convolutional code.

FIG. 5 illustrates an exemplary convolutional encoder 500 having a code rate of 1/10 (each information bit is encoded into 10 encoded bits). Convolutional encoder 500 may include shift registers 502, 504, 506, 508 and a delay register 510. Each of shift registers 502, 504, 506, 508 and delay register 510 has a respective input and output. Assuming that the five information bits are u=[$u_4$ $u_3$ $u_2$ $u_1$ $u_0$], an initial state of a convolutional encoder 500 may be as shown in FIG. 5. In the initial state, delay register 510 has bit $u_1$ as an input and no output, shift register 508 has bit $u_1$ as an output and bit $u_2$ as an input, shift register 506 has bit $u_2$ as an output and bit $u_3$ as an input, shift register 504 has bit $u_3$ as an output and bit $u_4$ as an input, and shift register 502 has bit $u_4$ as an output and bit $u_0$ as an input. Each of $g_{i,0}$, $g_{i,1}$, $g_{i,2}$, $g_{i,3}$, and $g_{i,4}$ may have a value of 0 or 1. Each of ⊕ (hereinafter, referred to as "xor") 510, 512, 514, 516 indicates an exclusive-or operation with two inputs, such that each input is either a 0 or a 1.

If a generator polynomial $g=(g_{i,0}\ g_{i,1}\ g_{i,2}\ g_{i,3}\ g_{i,4})$ and a generator polynomial $g0=(1\ 1\ 1\ 1\ 1)$, then $g_{0,0}=1$, $g_{0,1}=1$, $g_{0,2}=1$, $g_{0,3}=1$ and $g_{0,4}=1$. When a respective $g_i=1$, then a respective u bit is input to a respective xor. Otherwise, a 0 is input to the respective xor. Therefore, initially, a first bit produced, $p_0$, is $((((u_0\ \text{xor}\ u_4)\ \text{xor}\ u_3)\ \text{xor}\ u_2)\ \text{xor}\ u_1)$. When $g_{1,0}=1$, $g_{1,1}=1$, $g_{1,2}=1$, $g_{1,3}=1$, $g_{1,4}=1$, then a second bit produced, $p_1$, is $(((u_0\ \text{xor}\ u_3)\ \text{xor}\ u_2)\ \text{xor}\ u_1)$. When $g_{2,0}=1$, $g_{2,1}=1$, $g_{2,2}=0$, $g_{2,3}=0$ and $g_{2,4}=1$, then a third produced bit, $p_2$, is $((u_0\ \text{xor}\ u_4)\ \text{xor}\ u_1)$. When $g_{3,0}=1$, $g_{3,1}=1$, $g_{3,2}=0$, $g_{3,3}=1$ and $g_{3,4}=1$, then a fourth bit, $p_3$, is $(((u_0\ \text{xor}\ u_4)\ \text{xor}\ u_2)\ \text{xor}\ u_1)$. When $g_{4,0}=1$, $g_{1,1}=1$, $g_{1,2}=1$, $g_{1,3}=0$, $g_{1,4}=1$, then a fifth bit produced, $p_4$, is $(((u_0\ \text{xor}\ u_4)\ \text{xor}\ u_3)\ \text{xor}\ u_1)$. When $g_{5,0}=1$, $g_{5,1}=1$, $g_{5,2}=0$, $g_{5,3}=1$, $g_{5,4}=1$, then a sixth bit produced, $p_5$, is $(((u_0\ \text{xor}\ u_4)\ \text{xor}\ u_2)\ \text{xor}\ u_1)$. When $g_{6,0}=1$, $g_{6,1}=0$, $g_{6,2}=1$, $g_{6,3}=1$, $g_{6,4}=1$, then a seventh bit produced, $p_6$, is $(((u_0\ \text{xor}\ u_3)\ \text{xor}\ u_2)\ \text{xor}\ u_1)$. When $g_{7,0}=1$, $g_{7,1}=0$, $g_{7,2}=1$, $g_{7,3}=0$, $g_{7,4}=1$, then an eighth bit produced, $p_7$, is $((u_0\ \text{xor}\ u_2)\ \text{xor}\ u_1)$. When $g_{8,0}=1$, $g_{8,1}=0$, $g_{8,2}=0$, $g_{8,3}=1$, $g_{8,4}=1$, then a ninth bit produced, $p_8$, is $((u_0\ \text{xor}\ u_2)\ \text{xor}\ u_1)$. When $g_{9,0}=1$, $g_{9,1}=0$, $g_{9,2}=0$, $g_{9,3}=0$, $g_{9,4}=1$, then a tenth bit produced, $p_9$, is $(u_0\ \text{xor}\ u_1)$.

After generating bits $p_0$ through $p_9$, the u bits are shifted to the right and delay register 510 has an output of $u_1$ and an input of $u_2$, shift register 508 has an output of $u_2$ and an input of $u_3$, shift register 506 has an output of $u_3$ and an input of $u_4$, shift register 504 has an output of $u_4$ and an input of $u_0$, and shift register 502 has an output of $u_0$ and an input of $u_1$. Using the values of g0 through g9, to produce the next 10 bits, one can see that $p_{10}$ is $((((u_1\ \text{xor}\ u_0)\ \text{xor}\ u_4)\ \text{xor}\ u_3)\ \text{xor}\ u_2)$, pH, is $(((u_1\ \text{xor}\ u_4)\ \text{xor}\ u_3)\ \text{xor}\ u_2)$, $p_{12}$ is $((u_1\ \text{xor}\ u_0)\ \text{xor}\ u_2)$, $p_{13}$ is $(((u_1\ \text{xor}\ u_0)\ \text{xor}\ u_3)\ \text{xor}\ u_2)$, $p_{14}$ is $(((u_1\ \text{xor}\ u_0)\ \text{xor}\ u_4)\ \text{xor}\ u_2)$, $p_{15}$ is $(((u_1\ \text{xor}\ u_0)\ \text{xor}\ u_3)\ \text{xor}\ u_2)$, $p_{16}$ is $(((u_1\ \text{xor}\ u_4)\ \text{xor}\ u_3)\ \text{xor}\ u_2)$, $p_{17}$ is $((u_1\ \text{xor}\ u_4)\ \text{xor}\ u_2)$, $p_{18}$ is $((u_1\ \text{xor}\ u_3)\ \text{xor}\ u_2)$, and $p_{19}$ is $(u_1\ \text{xor}\ u_2)$.

After generating bits $p_{10}$ through $p_{19}$, the u bits are shifted to the right and delay register 510 has an output of $u_2$ and an input of $u_3$, shift register 508 has an output of $u_3$ and an input of $u_4$, shift register 506 has an output of $u_4$ and an input of $u_0$, shift register 504 has an output of $u_0$ and an input of $u_1$, and shift register 502 has an output of $u_1$ and an input of $u_2$. Using the values of g0 through g9, to produce the next 10 bits, one can see that par is $((((u_2\ \text{xor}\ u_1)\ \text{xor}\ u_0)\ \text{xor}\ u_4)\ \text{xor}\ u_3)$, $p_{21}$, is $(((u_2\ \text{xor}\ u_0)\ \text{xor}\ u_4)\ \text{xor}\ u_3)$, $p_{22}$ is $((u_2\ \text{xor}\ u_1)\ \text{xor}\ u_3)$, $p_{23}$ is $(((u_2\ \text{xor}\ u_1)\ \text{xor}\ u_4)\ \text{xor}\ u_3)$, $p_{24}$ is $(((u_2\ \text{xor}\ u_1)\ \text{xor}\ u_0)\ \text{xor}\ u_3)$, $p_{25}$ is $(((u_2\ \text{xor}\ u_1)\ \text{xor}\ u_4)\ \text{xor}\ u_3)$, $p_{26}$ is $(((u_2\ \text{xor}\ u_0)\ \text{xor}\ u_4)\ \text{xor}\ u_3)$, $p_{27}$ is $((u_2\ \text{xor}\ u_0)\ \text{xor}\ u_3)$, $p_{28}$ is $((u_2\ \text{xor}\ u_4)\ \text{xor}\ u_3)$, and $p_{29}$ is $(u_2\ \text{xor}\ u_3)$.

After generating bits par through $p_{29}$, the u bits are shifted to the right and delay register 510 has an output of $u_3$ and an input of $u_4$, shift register 508 has an output of $u_4$ and an input of $u_0$, shift register 506 has an output of $u_0$ and an input of $u_1$, shift register 504 has an output of $u_1$ and an input of $u_2$, and shift register 502 has an output of $u_2$ and an input of $u_3$. Using the values of g0 through g9, to produce the next 10 bits, one can see that $p_{30}$ is $((((u_3\ \text{xor}\ u_2)\ \text{xor}\ u_1)\ \text{xor}\ u_0)\ \text{xor}\ u_4)$, $p_{31}$, is $(((u_3\ \text{xor}\ u_1)\ \text{xor}\ u_0)\ \text{xor}\ u_4)$, $p_{32}$ is $((u_3\ \text{xor}\ u_2)\ \text{xor}\ u_4)$, $p_{33}$ is $(((u_3\ \text{xor}\ u_2)\ \text{xor}\ u_0)\ \text{xor}\ u_4)$, $p_{34}$ is $(((u_3\ \text{xor}\ u_2)\ \text{xor}\ u_1)\ \text{xor}\ u_4)$, $p_{35}$ is $(((u_3\ \text{xor}\ u_2)\ \text{xor}\ u_0)\ \text{xor}\ u_4)$, $p_{36}$ is $(((u_3\ \text{xor}\ u_1)\ \text{xor}\ u_0)\ \text{xor}\ u_4)$, $p_{37}$ is $((u_3\ \text{xor}\ u_1)\ \text{xor}\ u_4)$, $p_{38}$ is $((u_3\ \text{xor}\ u_0)\ \text{xor}\ u_4)$, and $p_{39}$ is $(u_3\ \text{xor}\ u_4)$.

After generating bits $p_{30}$ through $p_{39}$, the u bits are shifted to the right and delay register 510 has an output of $u_4$ and an input of $u_0$, shift register 508 has an output of $u_0$ and an input of $u_1$, shift register 506 has an output of $u_1$ and an input of $u_2$, shift register 504 has an output of $u_2$ and an input of $u_3$, and shift register 502 has an output of $u_3$ and an input of $u_4$. Using the values of g0 through g9, to produce the next 10 bits, one can see that $p_{40}$ is $((((u_4\ \text{xor}\ u_3)\ \text{xor}\ u_2)\ \text{xor}\ u_1)\ \text{xor}\ u_0)$, $p_{41}$, is $(((u_4\ \text{xor}\ u_2)\ \text{xor}\ u_1)\ \text{xor}\ u_0)$, $p_{42}$ is $((u_4\ \text{xor}\ u_3)\ \text{xor}\ u_0)$, $p_{43}$ is $(((u_4\ \text{xor}\ u_3)\ \text{xor}\ u_1)\ \text{xor}\ u_0)$, $p_{44}$ is $(((u_4\ \text{xor}\ u_3)\ \text{xor}\ u_2)\ \text{xor}\ u_0)$, $p_{45}$ is $(((u_4\ \text{xor}\ u_3)\ \text{xor}\ u_1)\ \text{xor}\ u_0)$, $p_{46}$ is $(((u_4\ \text{xor}\ u_2)\ \text{xor}\ u_1)\ \text{xor}\ u_0)$, $p_{47}$ is $((u_4\ \text{xor}\ u_2)\ \text{xor}\ u_0)$, $p_{48}$ is $((u_4\ \text{xor}\ u_1)\ \text{xor}\ u_0)$, and $p_{49}$ is $(u_4\ \text{xor}\ u_0)$.

After generating bits $p_{40}$ through $p_{49}$, the u bits are shifted to the right and delay register 510 has an output of $u_0$ and an input of $u_1$, shift register 508 has an output of $u_1$ and an input of $u_2$, shift register 506 has an output of $u_2$ and an input of $u_3$, shift register 504 has an output of $u_3$ and an input of $u_4$, and shift register 502 has an output of $u_4$ and an input of $u_0$. However, because this embodiment employs tail biting, the inputs and outputs of shift registers 502, 504, 506, 508 are exactly the same as those of the initial state. When the inputs and outputs of shift registers 502, 504, 506, 508 are identical to those of the initial state, the process is completed.

As one can see from the above example, when using convolutional coding with a code rate of 1/10, each of the five information bits, produces 10 coded bits. Therefore, exemplary convolutional encoder 500 produces a 50-bit codeword from the five information bits.

By altering the generator polynomials of FIG. 5 such that $gi=(g_{i,0},\ g_{i,1},\ g_{i,2},\ g_{i,3},\ g_{i,4})$, $g0=(1\ 0\ 1\ 0\ 1)$, $g1=(1\ 0\ 1\ 1\ 1)$, $g2=(1\ 1\ 0\ 1\ 1)$, $g3=(1\ 1\ 1\ 1\ 1)$, and $g4=(1\ 1\ 0\ 0\ 1)$ (with no $g_5$ through $g_9$, and continuing to use tail biting, altered exemplary convolutional encoder 500 may have a code rate of 1/5 (each information bit is encoded into 5 coded bits). By using the newly presented generator polynomials and performing the operations previously discussed with respect to the convolutional encoder having a code rate of 1/10 (a (50, 5) convolutional code), one can see that the information bits $u_4\ u_3\ u_2\ u_1\ u_0$ generate produced bits $p_0$ through $p_{24}$ as $p_0=((u_0\ \text{xor}\ u_3)\ \text{xor}\ u_1)$, $p_1=(((u_0\ \text{xor}\ u_3)\ \text{xor}\ u_2)\ \text{xor}\ u_1)$, $p_2=(((u_0\ \text{xor}\ u_4)\ \text{xor}\ u_2)\ \text{xor}\ u_1)$, $p_3=((((u_0\ \text{xor}\ u_4)\ \text{xor}\ u_3)\ \text{xor}\ u_2)\ \text{xor}\ u_1)$, $p_4=((u_0\ \text{xor}\ u_4)\ \text{xor}\ u_1)$, $p_5=((u_1\ \text{xor}\ u_4)\ \text{xor}\ u_2)$, $p_6=(((u_1\ \text{xor}\ u_4)\ \text{xor}\ u_3)\ \text{xor}\ u_2)$, $p_7=(((u_1\ \text{xor}\ u_0)\ \text{xor}\ u_3)\ \text{xor}\ u_2)$, $p_8=((((u_1\ \text{xor}\ u_0)\ \text{xor}\ u_4)\ \text{xor}\ u_3)\ \text{xor}\ u_2)$, $p_9=\text{xor}\ u_0)\ \text{xor}\ u_2)$, $p_{10}=((u_2\ \text{xor}\ u_0)\ \text{xor}\ u_3)$, $p_{11}=(((u_2\ \text{xor}\ u_0)\ \text{xor}\ u_4)\ \text{xor}\ u_1)$, $p_{12}=(((u_2\ \text{xor}\ u_1)\ \text{xor}\ u_4)\ \text{xor}\ u_3)$, $p_{13}=((((u_2\ \text{xor}\ u_1)\ \text{xor}\ u_0)\ \text{xor}\ u_4)\ \text{xor}\ u_3)$, $p_{14}=((u_2\ \text{xor}\ u_1)\ \text{xor}\ u_3)$, $p_{15}=((u_3\ \text{xor}\ u_1)\ \text{xor}\ u_4)$, $p_{16}=(((u_3\ \text{xor}\ u_1)\ \text{xor}\ u_0)\ \text{xor}\ u_2)$, $p_{17}=(((u_3\ \text{xor}\ u_2)\ \text{xor}\ u_0)\ \text{xor}\ u_4)$, $p_{18}=((((u_3\ \text{xor}\ u_2)\ \text{xor}\ u_1)\ \text{xor}\ u_0)\ \text{xor}\ u_4)$, $p_{19}=((u_3\ \text{xor}\ u_2)\ \text{xor}\ u_4)$, $p_{20}=((u_4\ \text{xor}\ u_2)\ \text{xor}\ u_0)$, $p_{21}=(((u_4\ \text{xor}\ u_2)\ \text{xor}\ u_1)\ \text{xor}\ u_3)$, $p_{22}=(((u_4\ \text{xor}\ u_3)\ \text{xor}\ u_1)\ \text{xor}\ u_0)$, $p_{23}=((((u_4\ \text{xor}\ u_1)\ \text{xor}\ u_2)\ \text{xor}\ u_1)\ \text{xor}\ u_0)$, and $p_{24}=((u_4\ \text{xor}\ u_3)\ \text{xor}\ u_0)$. When using convolutional coding, a BPSK modulation or a $$\frac{\pi}{2}$$

shifted BPSK modulation is very robust, as previously mentioned, and may be used to modulate the burst header. Other types of modulation may be used in other embodiments, including, but not limited to, offset quadrature phase shift keying (OQPSK), 8 phase shift keying (8PSK), and 16 amplitude and phase shift keying (16APSK).

Figure 6:
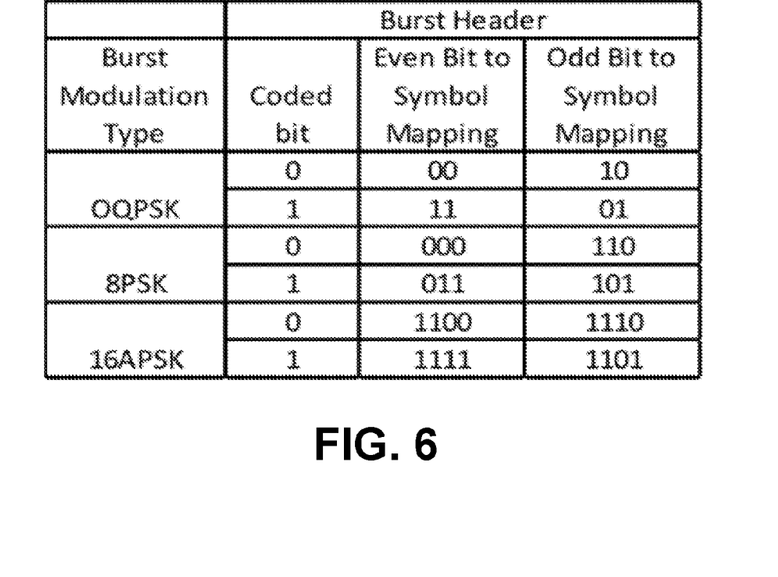
FIG. 6 illustrates a table for mapping coded bits to symbols for a desired modulation type such that a modulation effectively becomes a binary phase shift keying modulation.
Figure 7:
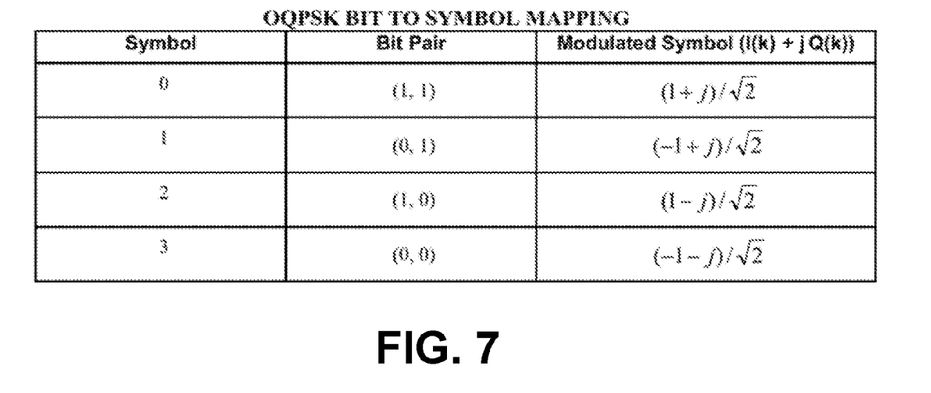
FIGS. 7-9 illustrate bit to symbol mapping for OQPSK, 8PSK and 16APSK burst header modulation types, respectively.
Figure 8:
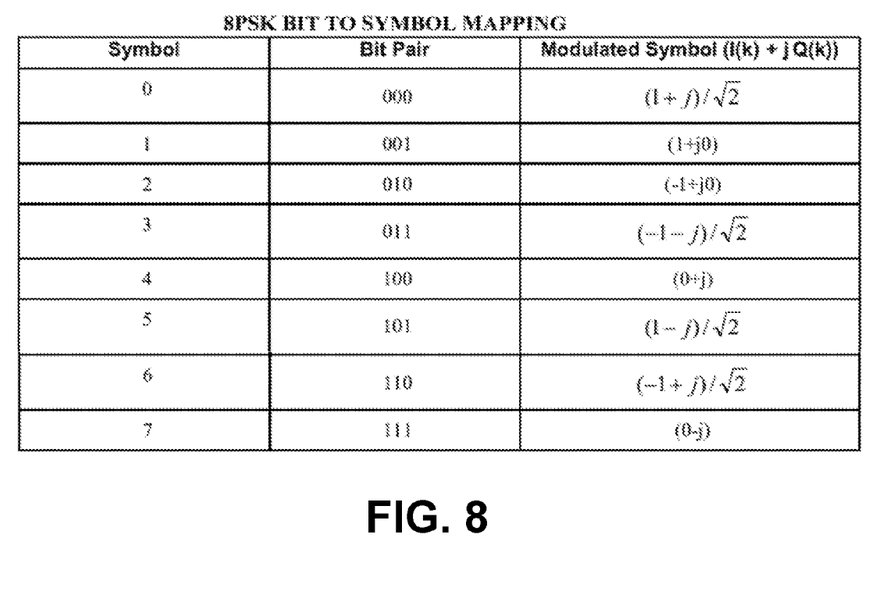
Figure 9:
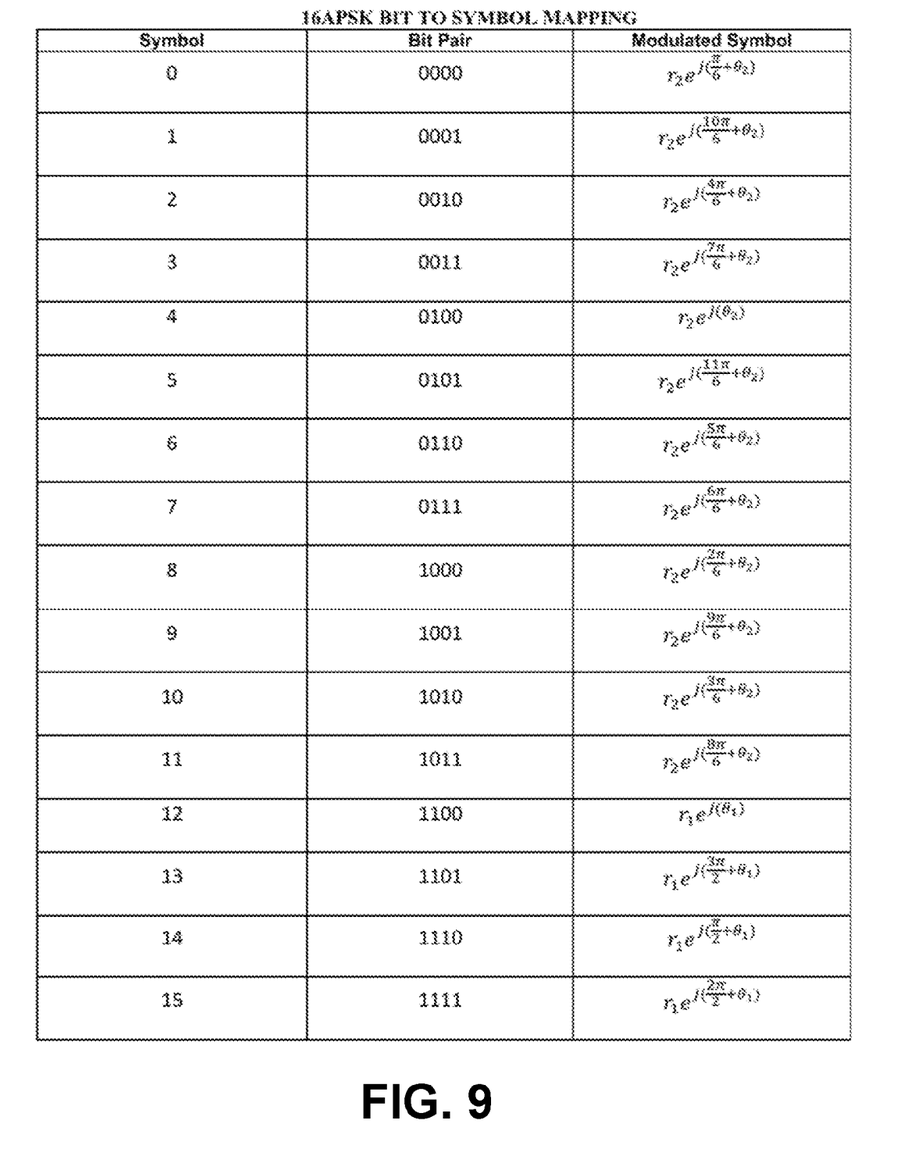

In some embodiments, a burst header may be modulated according to a predefined modulation, which may include the OQPSK modulation, the 8PSK modulation, or the 16APSK modulation. However, by mapping each coded bit of the code header, the effective modulation type for the modulated burst header may be $$\frac{\pi}{2}$$

shifted BPSK. For example, with reference to FIG. 6, when OQPSK modulation is to be used for modulating the burst header, an even coded bit of the burst header having a value of 0 is mapped to a symbol of 00, an even coded bit of the burst header having a value of 1 is mapped to a symbol of 11, an odd coded bit of the burst header having a value of 0 is mapped to a symbol of 10, and an odd coded bit of the burst header having a value of 1 is mapped to a symbol of 01. When 8PSK modulation is to be used for modulating the burst header, an even coded bit of the burst header having a value of 0 is mapped to a symbol of 000, an even coded bit of the burst header having a value of 1 is mapped to a symbol having a value of 011, an odd coded bit of the burst header having a value of 0 is mapped to a symbol having a value of 110, and an odd coded bit having a value of 1 is mapped to a symbol having a value of 101. When 16APSK modulation is to be used for modulating the burst header an even coded bit of the burst header having a value of 0 is mapped to a symbol having a value of 1100, an even coded bit of the burst header having a value of 1 is mapped to a symbol having a value of 1111, an odd coded bit having a value of 0 is mapped to a symbol of 1110, and an odd coded bit having a value of 1 is mapped to a symbol of 1101. This assumes that the bit to symbol mapping for OQPSK, 8PSk and 16APSK is as given in FIGS. 7-9, respectively.

By performing the mappings as described above, an effective modulation of the burst header is $$\frac{\pi}{2}$$

shifted BPSK.

Satellite Gateway

Figure 10:
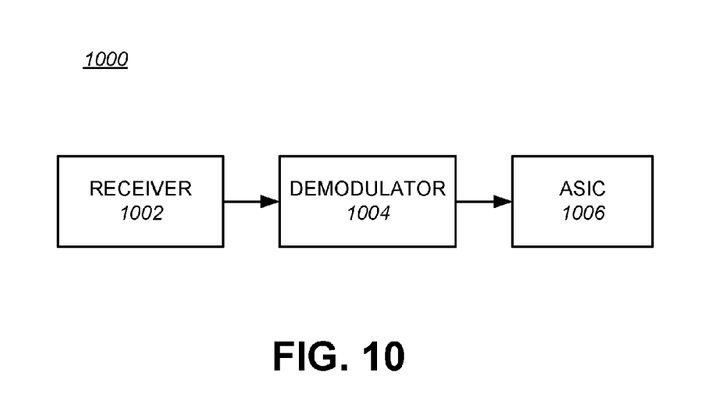
FIG. 10 shows a functional block diagram of a portion of an exemplary satellite gateway.

FIG. 10 is a functional block diagram illustrating a portion 1000 of satellite gateway 106. Satellite gateway 106 may include a receiver 1002, a demodulator 1004, and an application specific integrated circuit (ASIC) 1006. Receiver 1002 may receive modulated encoded bits as symbols according to a predefined modulation type for a burst header of a burst. Demodulator 1004 may receive the modulated encoded bits from receiver 1002 and may demodulate the modulated encoded bits to provide the encoded bits. ASIC 1006 may decode the encoded bits representing information bits based on a particular encoding scheme, which may include a Reed-Muller (16,5) code, a block code (32,5), a convolutional code, or another type of encoding scheme. In at least some embodiments, the information bits include five information bits, which may represent one or more of a modulation type, a code rate, a code type and a spreading factor for a payload of a burst. In an alternate embodiment, ASIC 1006 may be replaced by either a FPGA or a DSP.

CONCLUSION

The disclosed embodiments provide a number of advantages over existing systems such as:
a. provides for flexible expansion of supported code rates per inroute without changing a length of the UW;
b. eliminates the task of finding a good set of UWs each time additional code rates are added;
c. allows modulation and code rate changes for payloads from burst to burst on an inroute;
d. allows for more efficient use of bandwidth; and
e. provides other information such as a spreading factor for a payload of a burst.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Accordingly, the appended claims and their legal equivalents should only define the invention, rather than any specific examples given.

We claim as our invention:

1. A machine-implemented method for encoding a burst header of a burst to be transmitted on an inroute from a satellite terminal, the machine-implemented method comprising:
generating, by an application specific integrated circuit of a satellite terminal, a burst header, the burst header having encoded therein, via a (16, 5) Reed-Muller code, a (32, 5) block code or a convolutional code having a code rate of either 1/5 or 1/10, five information bits representing a modulation type for modulating a payload of the burst, a code rate for the payload, a spreading factor for the payload and a code type for encoding the payload;
providing the burst, including the burst header and the payload to a modulator;
modulating the burst header via a binary phase shift keying modulation;
modulating the payload data via a modulation matching the modulation type encoded within the burst header; and
transmitting the modulated burst header and the modulated payload data, the modulated payload data having a first code rate matching the code rate encoded within the burst header.

2. The machine-implemented method of claim 1, wherein:
the modulated payload data is transmitted using a first spreading factor matching the spreading factor represented by the five information bits.

3. The machine-implemented method of claim 1, further comprising:
encoding the payload data via a first code type matching the code type represented by the five information bits.

4. The machine-implemented method of claim 1, wherein the modulating the burst header via a binary phase shift keying modulation comprises:
modulating the burst header via a $$\frac{\pi}{2}$$

shifted binary phase shift keying modulation.

5. The machine-implemented method of claim 1, further comprising:
encoding the five information bits of the burst header using the (32, 5) block code.

6. The machine-implemented method of claim 1, further comprising:
encoding the five information bits of the burst header using the (16, 5) Reed-Muller code to generate a 16 bit codeword which is repeated once to produce 32 bits of the burst header.

7. The machine-implemented method of claim 1, wherein the generating the burst header further comprises:
encoding the five information bits of the burst header using the convolutional code to produce a 50 bit codeword.

8. The machine-implemented method of claim 7, wherein tail bits are not transmitted.

9. The machine-implemented method of claim 1, further comprising:
mapping bits of the encoded five information bits of the burst header to respective symbols according to a desired modulation type for the payload, the desired modulation type being a modulation type selected from a group consisting of an offset quadrature phase shift keying modulation type, an 8 phase shift keying modulation type, and a 16 amplitude and phase shift keying modulation type, wherein
as a result of the mapping bits, an effective modulation type for the burst header is a $$\frac{\pi}{2}$$

shifted binary phase shift keying modulation type.

10. The machine-implemented method of claim 1, wherein when the burst header is encoded by the convolutional code having the code rate of 1/5, the encoded burst header includes a 25 bit codeword which is repeated once, thereby producing 50 bits included in the encoded burst header.

11. A machine-implemented method for decoding a burst header of a burst, the machine-implemented method comprising:
receiving, by a satellite gateway, the burst including the burst header and encoded payload data;
demodulating, by the satellite gateway, the burst header having been modulated using a predefined phase shift keying modulation type;
decoding the burst header by the satellite gateway, the burst header having five information bits encoded therein via a (16, 5) Reed-Muller code, a (32, 5) block code or a convolutional code having a code rate of either 1/5 or 1/10, the five information bits representing, with respect to payload data, a modulation type, a first code rate, a spreading factor for the payload data and a code type for encoding the payload data; and
demodulating the encoded payload data modulated using the modulation type, the encoded payload data having been encoded at the first code rate.

12. The machine-implemented method of claim 11, further comprising:
decoding the encoded payload data according to an encoding method having the first code rate represented by the five information bits encoded in the burst header.

13. The machine-implemented method of claim 11, wherein the decoding the burst header further comprises decoding the burst header, based on the (16, 5) Reed-Muller code to produce the five information bits.

14. The machine-implemented method of claim 11, wherein the decoding the burst header further comprises decoding a 50 bit codeword, encoded by using the convolutional code, to encode the five information bits.

15. The machine-implemented method of claim 11, wherein the decoding the burst header further comprises:
combining two sets of 25 bits of the burst header into one set of 25 bits; and
decoding the one set of 25 bits of the burst header, encoded using the convolutional code, to produce the five information bits.

16. A satellite terminal comprising:
one component selected from a group of components consisting of an application specific integrated circuit, a field programmable gate array, and a digital signal processor, the one component being arranged to generate a burst header for a burst, the burst header having encoded therein, via a (16, 5) Reed-Muller code, a (32, 5) block code or a convolutional code having a code rate of either 1/5 or 1/10, and five information bits representing a modulation type for a payload of the burst, a code rate for the payload, a spreading factor for the payload and a code type for encoding the payload;
a modulator arranged to receive the burst including the burst header and the payload, modulate the burst header via a binary phase shift keying modulation, and modulate the payload via a modulation matching the modulation type encoded within the burst header; and
a transmitter arranged to transmit the modulated burst header and the modulated payload, the modulated payload having been encoded at a first code rate matching the code rate encoded within the burst header.

17. The satellite terminal of claim 16, wherein:
the transmitter is further arranged to spread the modulated payload by a first spreading factor matching the spreading factor represented by the five information bits.

18. The satellite terminal of claim 16, wherein:
the one component is further arranged to encode the payload using a first code type matching the code type represented by the five information bits.

19. The satellite terminal of claim 16, wherein the one component is further arranged to encode the five information bits of the burst header using either the (16,5) Reed-Muller code to generate a 16 bit codeword which is repeated once to produce 32 bits included in the burst header, or the (32, 5) block code to produce a 32 bit codeword.

20. The satellite terminal of claim 16, wherein the one component is further arranged to encode the five information bits of the burst header using the convolutional code to produce either a 50 bit codeword or a 25 bit codeword which is repeated once to produce 50 bits included in the burst header.

* * * * *